(12) United States Patent
Vorac (10) Patent No.: US 6,517,157 B1
(45) Date of Patent: Feb. 11, 2003

(54) APPARATUS FOR ADJUSTING A SEAT BELT (75) Inventor: Shane Michael Vorac, Waterford, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/810,847

(22) Filed: Mar. 16, 2001

(51) Int. Cl.⁷ .................................................. A47C 1/02
(52) U.S. Cl. ........................... 297/344.13; 297/344.15; 297/344.17; 297/464
(58) Field of Search ..................... 297/344.13, 344.15, 297/344.17, 468, 464

(56) References Cited

U.S. PATENT DOCUMENTS

| 3,737,197 | A |   | 6/1973  | Hall et al.      |          |
|-----------|---|---|---------|------------------|----------|
| 3,758,158 | A |   | 9/1973  | Radke et al.     |          |
| 3,811,727 | A |   | 5/1974  | Rumpel           |          |
| 3,977,725 | A |   | 8/1976  | Tengler et al.   |          |
| 4,025,110 | A |   | 5/1977  | Poorman          |          |
| 4,225,184 | A | * | 9/1980  | Strowick         | 297/468  |
| 4,229,041 | A |   | 10/1980 | Werner           |          |
| 4,508,386 | A | * | 4/1985  | Hofmann          | 297/344.13 |
| 4,790,597 | A | * | 12/1988 | Bauer et al.     | 297/468  |
| 4,880,199 | A | * | 11/1989 | Harney           | 248/396  |
| 5,226,697 | A | * | 7/1993  | Borlinghaus et al. | 297/216.18 |
| 5,282,672 | A |   | 2/1994  | Borlinghaus      |          |
| 6,116,689 | A | * | 9/2000  | Bauer et al.     | 297/344.15 |
| 2001/0005003 | A1 |   | 6/2001 | Koga et al.     |          |

FOREIGN PATENT DOCUMENTS

EP   0 366 364   10/1989

* cited by examiner

Primary Examiner—Peter M. Cuomo
Assistant Examiner—Joseph Edell
(74) Attorney, Agent, or Firm—Foley & Lardner (57) ABSTRACT A seat apparatus is provided for a vehicle comprising a first mechanism for moving a seat horizontally relative to the floor of the vehicle and a second mechanism movably mounted to the first mechanism for moving the seat vertically relative to the floor of the vehicle. The second mechanism includes at least one link and a motor drive assembly operatively associated with the link to move the seat vertically. The seat apparatus further includes a third mechanism for moving a seat belt to adjust for vertical and horizontal movement of the seat in order to insure that the seat belt will remain stationary relative to an occupant seated on the seat. The third mechanism is responsive to the motor drive assembly for moving the seat belt simultaneously with vertical movement of the seat.

17 Claims, 6 Drawing Sheets

APPARATUS FOR ADJUSTING A SEAT BELT

FIELD OF THE INVENTION

The present invention relates generally to a seat belt for a seat in a moving vehicle and more particularly to a mechanism for a seat belt which allows the seat belt to raise and lower with the occupant as the seat is adjusted vertically.

BACKGROUND OF THE INVENTION

There are many variations in vehicle occupant restraint systems. In one such vehicle restraint system, a seat belt is used which consists of a lap belt and a shoulder belt that merge at a clasp structured to releasably engage a manual buckle mechanism or assembly. The buckle is typically attached to the underbody of the vehicle to function as an anchor when the occupant restraint system is in use. The buckle is normally positioned at or near the seat cushion or pan on the inboard side of the seat for easy accessibility when joining or disjoining the seat belt and buckle assembly.

In many of the vehicles designed today, the occupant is provided with a power seat adjustment feature, which allows the occupant to adjust the seat both horizontally and vertically to position or orient the occupant in a comfortable position. However, as the seat rises a distance vertically, the seat belt cannot accommodate the change in vertical distance. Consequently, the lap belt begins to tighten or pinch the occupant which makes it uncomfortable. This problem is not limited to the seat belt described above.

The prior art has attempted to address this concern. One example of a mechanism used to accommodate vertical and horizontal seat movement is shown in U.S. Pat. No. 3,977, 725. While such a mechanism may accomplish the desired task, it was designed for a suspension seat for a truck wherein the seat experiences large vertical travel. For this reason, the mechanisms for supporting/moving the seat and for adjusting the seat belt employ an elaborate and sizable set of components. However, in vehicles with limited seat space and motion such as automobiles, these components are neither acceptable nor required. Space is a greater concern for those vehicles that employ power seat adjustment components.

Now, for those vehicles that do provide such power seat adjustment features, there does not exist a simple and space saving design for seat belt adjustment components that will function simultaneously with the power seat adjustment components. It follows that there does not exist a design for seat belt adjustment that minimizes or even eliminates damage to the power seat adjustment components resulting from a crash load.

It would therefore be desirable for a vehicle to employ a mechanism that allows the seat belt to raise and lower with the occupant as the seat is adjusted vertically which overcomes the drawbacks of the prior art described above.

SUMMARY OF THE INVENTION

An object of the present invention is to provide a mechanism for a seat belt that allows the seat belt to raise and lower with the occupant as the seat is adjusted vertically that overcomes the disadvantages of the prior art.

Another object of the present invention is to provide a mechanism for a seat belt that allows the seat belt to raise and lower with the occupant as the seat is adjusted vertically which uses fewer components so that the mechanism fits within a confined space in an automobile.

Another object of the present invention is to provide a mechanism for a seat belt that allows the seat belt to raise and lower with the occupant as the seat is adjusted vertically which reduces or eliminates damage to power seat adjustment components as a result of a crash load.

These objects and other objects are accomplished by the present invention described in the following detailed description of the preferred embodiment, taken generally with the Figures.

Generally, however, the present invention provides a seat apparatus for a vehicle comprising a first mechanism for moving a seat horizontally relative to the floor of the vehicle and a second mechanism movably mounted to the first mechanism for moving the seat vertically relative to the floor of the vehicle. The second mechanism includes at least one link for supporting the seat and a motor drive assembly operatively associated with the link to move the seat vertically. The seat apparatus further includes a third mechanism for moving a seat belt to adjust for vertical movement of the seat in order to insure that the seat belt will remain stationary relative to an occupant seated on the seat. The third mechanism is responsive to the motor drive assembly for moving the seat belt simultaneously with vertical movement of the seat.

The present invention also provides a seat apparatus for a vehicle comprising a first mechanism for moving a seat horizontally relative to the floor of the vehicle. The mechanism includes first and second lower tracks mounted to the floor of the vehicle and first and second upper tracks movably carried on the first and second tracks, respectively. The seat apparatus also comprises a second mechanism movably mounted to the first and second upper tracks for moving the seat vertically relative to the floor of the vehicle. The second mechanism includes (1) a pair of lift links for lifting the seat and (2) a drive motor assembly operatively associated with the lift links for causing the pair of lift links to move the seat generally vertically. The seat apparatus further comprises a third mechanism for moving a seat belt to adjust for vertical movement of the seat in order to insure that the seat belt will remain stationary relative to an occupant seated on the seat, of the third mechanism including (1) a first seat belt link pivotably attached to the first upper track and (2) a motor drive assembly operatively associated with the first seat belt link to cause said seat belt link to pivot.

BRIEF DESCRIPTION OF THE DRAWINGS

In the figures, like reference numerals are used to denote like components and

DETAILED DESCRIPTION OF THE PREFERRED EMBODIMENTS

Figure 1:
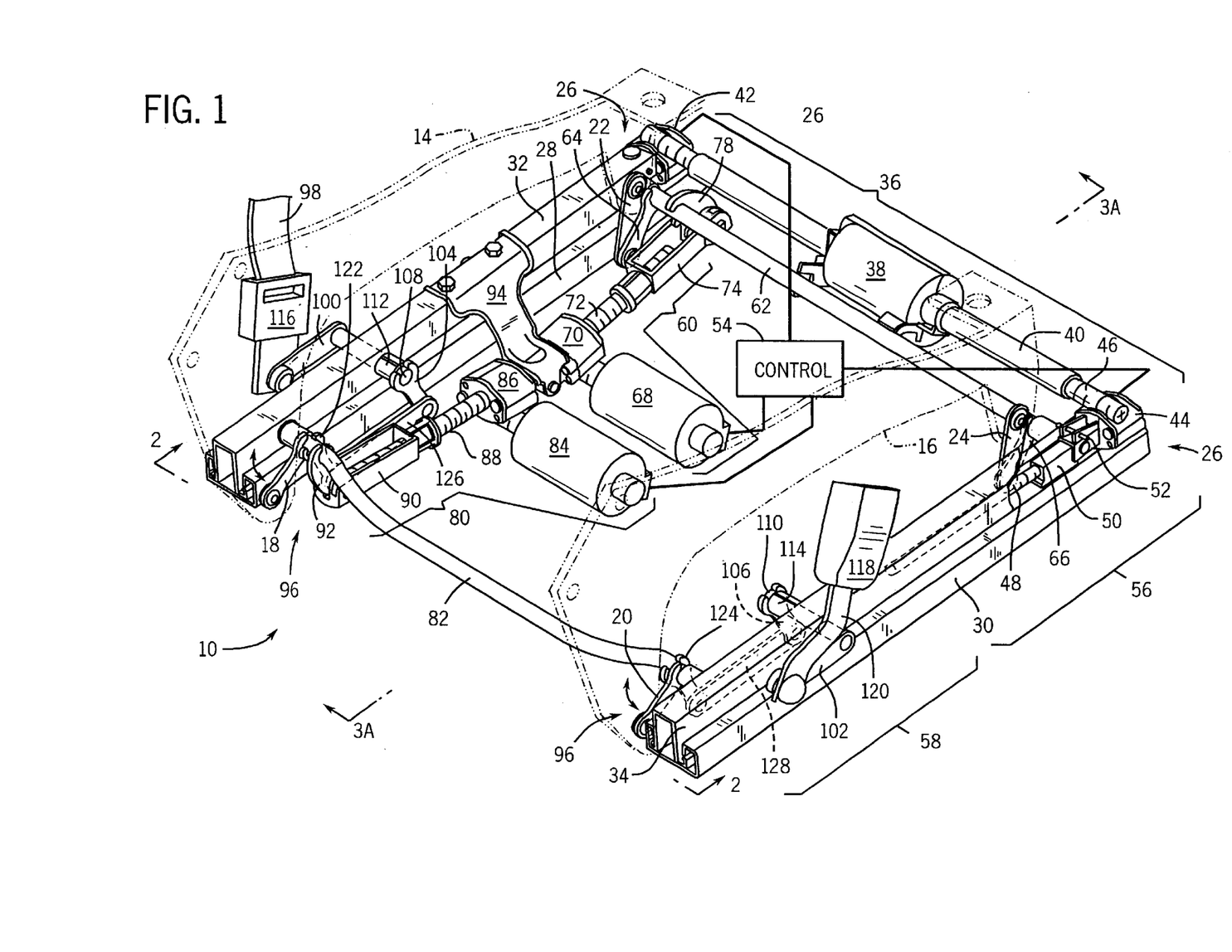
FIG. 1 is a perspective view of a seat apparatus incorporating one embodiment of the mechanism for moving a seat belt in accordance with the present invention.
Figure 2:
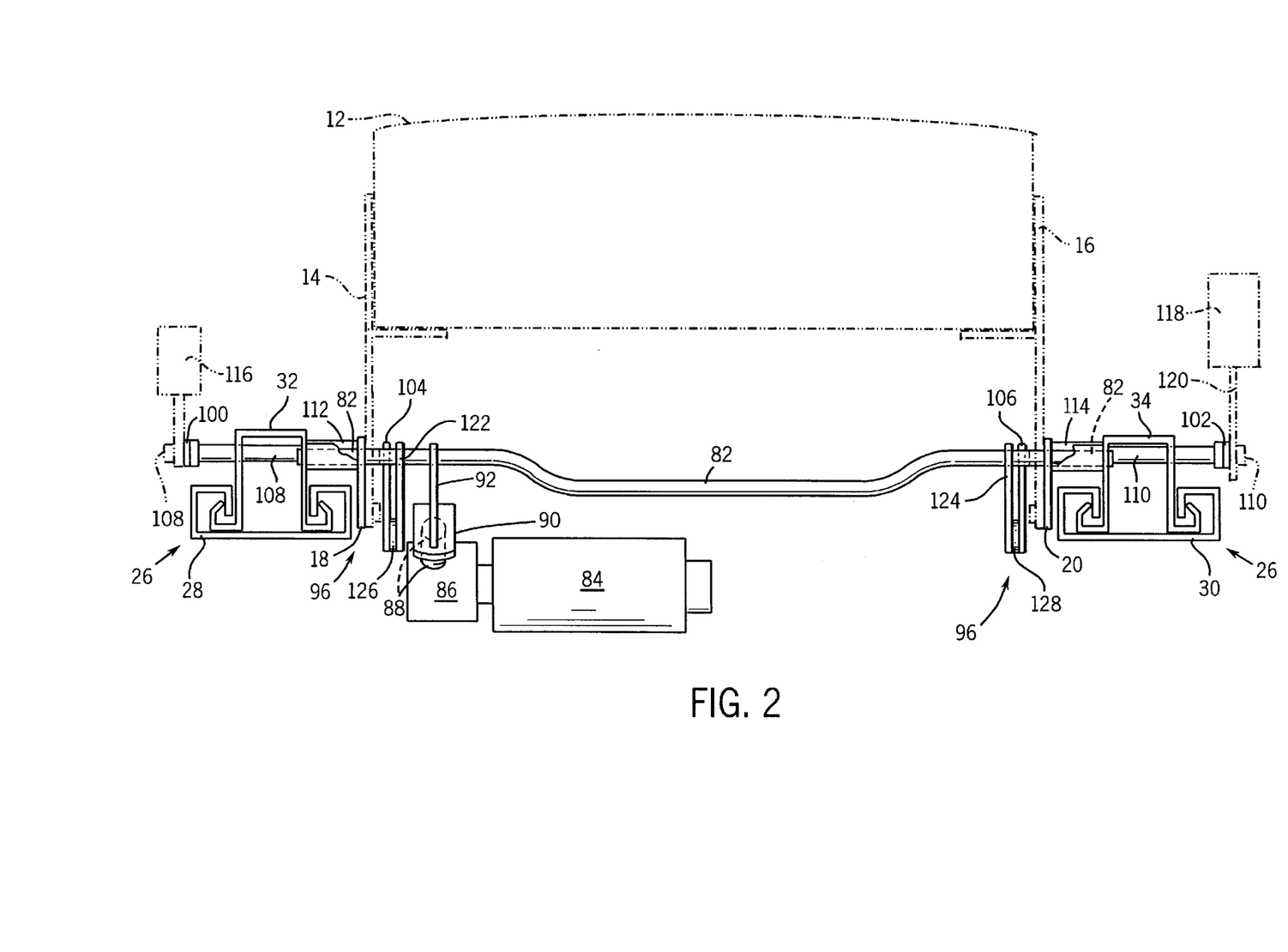
FIG. 2 is a rear view of the seat apparatus shown in FIG. 1 taken along lines 2—2.

Proceeding now to a description of the preferred embodiment, FIGS. 1 and 2 illustrate a vehicle seat apparatus 10 in which a seat 12 is installed on seat support brackets 14,16. As will be discussed in detail below, seat support brackets 14,16 are attached to (vertical) lift links 18,20 and lift links 22,24 for raising and lowering support brackets 14,16, respectively. Seat apparatus 10 includes a mechanism 26 for moving seat 12 horizontally. Mechanism 26 includes a pair of opposing parallel lower tracks 28,30 securely mounted (by bolts) to the floor of a vehicle, and a pair of opposing upper tracks 32,34 mounted to slide within the lower tracks 28,30. In the preferred embodiment shown, lower track 28 and upper track 30 are positioned on the outboard side and lower track 30 and upper track 34 are positioned on the inboard side of the vehicle.

Seat apparatus 10 also includes a horizontal motor drive assembly 36 (also shown in FIG. 7 described below) consisting of a drive motor 38 and a drive bar 40 which has ends that extend away from the drive motor 38, towards opposing upper 32,34 and lower tracks 28,30. Motor drive assembly 36 further includes two horizontal gear boxes 42,44 integrally formed with the ends of drive bar 40. It is seen in a cut away portion of an end of drive bar 40 that there is a motor screw 46 which interacts with the components inside horizontal gear boxes 42,44. It is further seen from a cut away view of upper track 34, motor drive assembly 36 further includes drive screw 48 and horizontal drive nut 50 threaded on drive screw 48 and bolted on a bottom wall thereof to lower track 30. (Note that motor drive assembly 36 also includes an identical drive screw and drive nut on the outboard side, associated with horizontal gear box 42 and upper track 32, which function the same as drive screw 48 and drive nut 50 on the inboard side. However, these components are not shown.) Horizontal gear box 44 is mounted to upper track 34 by way of a pin 52 which extends through a portion of gear box 44 into corresponding holes (no shown) in upper track 34. Gear boxes 42,44 therefore simultaneously move with upper tracks 32,34 along lower tracks 28,30.

Horizontal drive assembly 36 is controlled by control apparatus 54 which includes among other components including a switch (not shown). The switch is preferably mounted to the door of the vehicle. In operation, when the occupant wishes to move his/her seat forward, the occupant typically depresses the switch, and control box 54 activates motor 38 which causes gear boxes 42,44 to rotate drive screws 48 (and opposing drive screw not shown). Upper tracks 32,34 thus move horizontally as desired, along with (1) gear boxes 42,44 attached thereto and (2) drive motor 38.

The seat apparatus 10 also includes front mechanism 56 and a rear mechanism 58 movably mounted to upper tracks 32,34 for moving seat 12 vertically relative to the floor of the vehicle. The front mechanism 56 and rear mechanism 58 are controlled by control box 54 which includes two switches (not shown) preferably located on the door of a vehicle. However, mechanisms 56,58 may alternatively be controlled by another control box. In this embodiment, mechanisms 56 and 58 are activated and controlled separately by two separate switches. Therefore, mechanisms 56, 58 move independently from one another, in response to the switches, should the occupant wish to raise or lower either the front or rear of seat 12.

Front mechanism 56 includes a front motor drive assembly 60 and a front torsion bar 62 having opposite ends attached to upper tracks 32,34. Torsion bar 62 is capable of rotating with respect to upper tracks 32,34. Front mechanism 56 includes a pair of opposing front seat lift links 22,24 pivotably attached to brackets 14,16 via slave links 64,66 which are welded to torsion bar 62.

Front motor drive assembly 60 includes a front vertical motor 68, front vertical gear box 70 integrally formed to motor 68, a drive screw 72 extending from gear box 70, and front vertical drive nut 74 threaded on drive screw 72. Front motor drive assembly 60 also includes front drive link 78 pivotably connected at one end thereof to front vertical drive nut 74 and secured (by weld) to the other end thereof to front torsion bar 62, thereby coupling front drive nut 74 to front torsion bar 62. In operation, a switch (not shown) electrically activates front vertical motor 68. In response screw 72 is rotated to move front vertical drive nut 74 either forward or backward as desired, causing front drive link 78 to pivot and front torsion bar 62 to rotate. As a result, front seat lifts 22,24 pivot and move in an arcuate direction causing the front of the seat 12 to move vertically.

Front and rear mechanisms 56 and 58 use similar components which function similarly. Rear mechanism 58 includes a motor drive assembly 80, rear torsion bar 82, and a pair of opposing rear seat lift links 18,20. Seat belt lift links 18,20 are each pivotably attached at one end thereof to brackets 14,16 and secured at the other end thereof to torsion bar 82. Torsion bar 82 is attached at opposite ends thereof to the upper tracks 32,34 and capable of rotating with respect thereto.

Rear motor drive assembly 80 includes a rear vertical motor 84, rear vertical gear box 86 integrally formed to the motor 84, a drive screw 88 extending from gear box 86, and rear vertical drive nut 90 threaded on screw 88. Rear motor drive assembly 80 also includes rear drive link 92 pivotably attached to rear vertical drive nut 90 and secured (by weld) to rear torsion bar 82, thereby coupling rear drive nut 90 to rear torsion bar 82. In operation, a switch electrically activates rear vertical motor 84. In response, screw 88 is rotated to move rear vertical drive nut 90 either forward or backward as desired, causing rear drive link 46 to pivot and rear torsion bar 82 to rotate. As a result, rear seat lifts 18,20 pivot and move in a generally arcuate direction, causing the rear brackets 14,16 and seat 12 supported thereon to move vertically.

The mechanisms 36 for moving seat 12 horizontally, mechanisms 56 and 58 for moving seat 12 vertically and the control apparatus', together are known as the power seat adjustment mechanisms.

Note that the apparatus 10 also includes a vertical drive bracket 94 which is mounted to upper track 32. Front and rear gear boxes 70 and 86 are bolted to an end of vertical drive bracket 94. Bracket 94 functions to support motor assemblies 60 and 80 during horizontal and vertical movement of seat apparatus 10. Note that the particular design and components used for mechanisms 36 and 56, 58 described herein (for moving seat 12 horizontally and vertically) are identified as the preferred embodiment. Many different variations exist however for these mechanisms and their components. In addition, the seat apparatus 10 may be used in all types of vehicles such as trucks and automobiles.

Seat apparatus 10 also includes a mechanism 96 for moving a seat belt 98 to adjust for vertical movement of seat 12. The mechanism 96 will ensure that seat belt 98 will remain stationary relative to an occupant seated on seat 12. Mechanism 96 includes seat belt links 100,102 positioned on the outside of upper tracks 32,34 and slave links 104,106 positioned on the inside of upper tracks 32,34. Seat belt links 100,102 and slave links 104,106, respectively, are secured (by weld) at the ends thereof to drive rods 108, 110. Rods 108, 110 each slidingly fit within members 112,114 of upper tracks 32,34, respectively. Seat belt links 100,102 and slave links 104,106 are therefore said to be attached to upper tracks 32,34 and capable of pivoting or rotating with respect to upper tracks 32,34.

As described, the ends of seat belt links 100,102 are pivotably attached to upper tracks 32,34. At the other end of seat belt links 100,102, there are seat belt components attached thereto. On the outboard side, clasp 116 is pivotably attached to seat belt link 100. A buckle 118 and strap 120 are attached to seat belt link 102 on the inboard side of the vehicle. Mechanism 96 also includes drive links 122,124 welded at one end thereof to rear torsion bar 82 and follower links 126,128 pivotably attached at the ends thereof to slave links 104,106 and drive links 122,124, respectively.

Figure 3A:
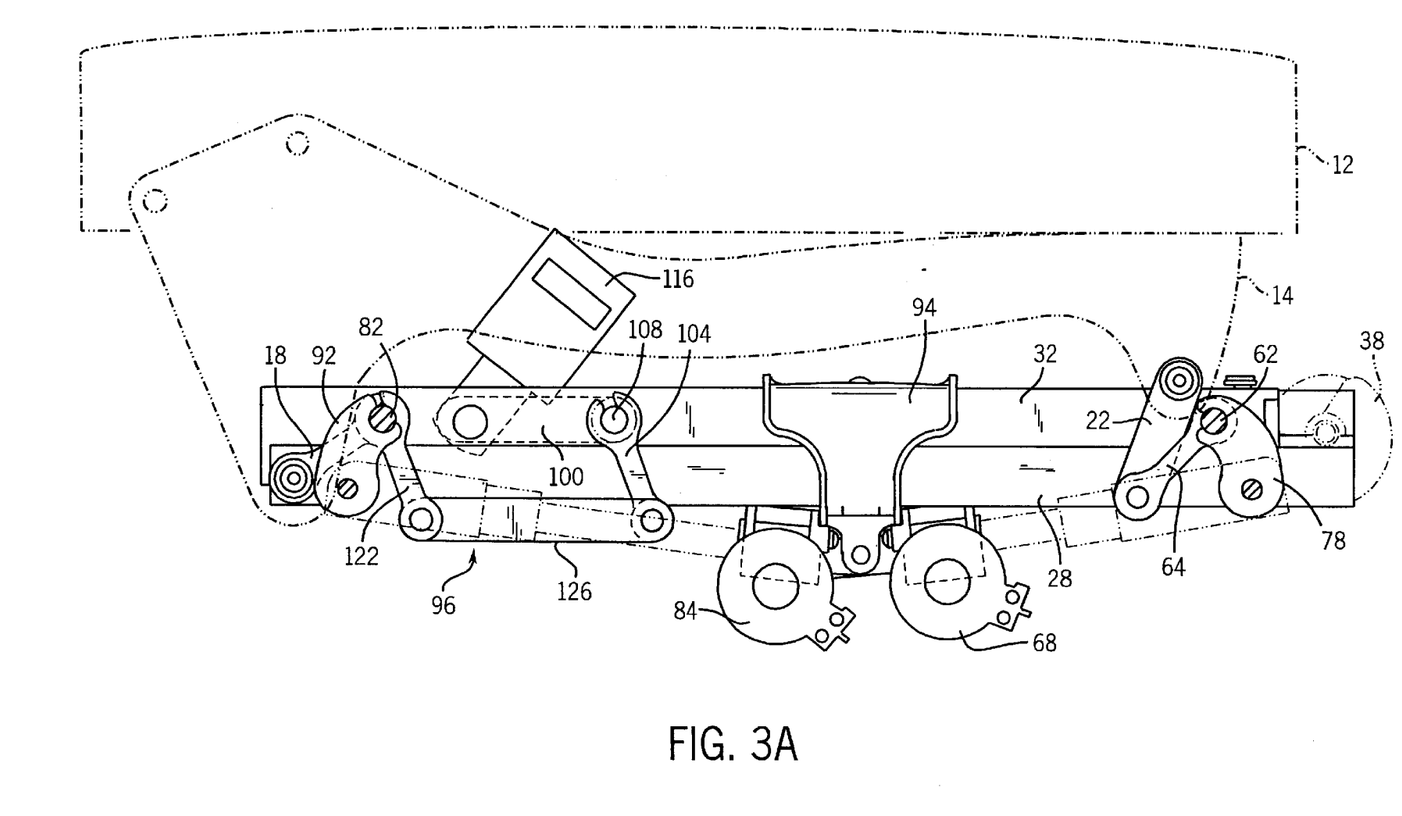
FIG. 3A is a sectional view of the seat apparatus shown in FIG. 1 taken along lines 3A—3A.
Figure 3B:
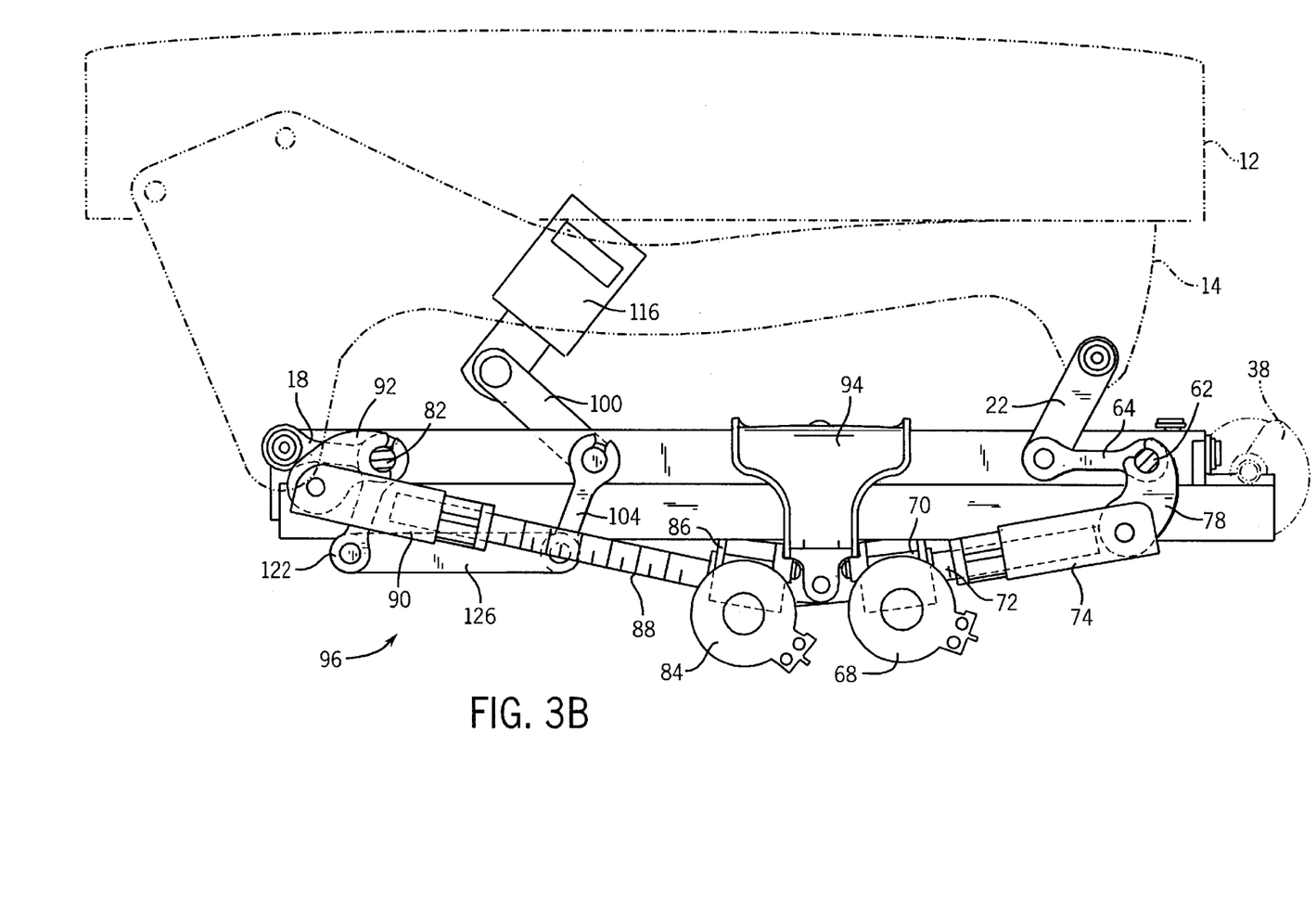
FIG. 3B is a view of the seat apparatus shown in FIG. 3A when the seat belt has been adjusted.

In operation, an occupant activates a switch to power the rear vertical seat adjustment components. In particular, rear drive motor 84 causes rear drive nut 90 to extend (or retract) outwardly toward the rear. Rear drive link 92 causes torsion bar 82 to rotate with respect to upper tracks 32,34. Hence lift links 18,20 rotate causing seat brackets 14,16 to rise vertically. Now, as torsion bar 82 rotates, drive links 122,124 simultaneously rotate, pulling follower links 126,128 toward the rear of the vehicle. Follower links 126,128 consequently pull on slave links 104,106 and cause them to rotate, driving drive seat belt links 100,102 to pivot or rotate clockwise. Consequently, the seat belt attachments (clasp 116, buckle 118, strap 120) rise (i.e., move upwardly and forwardly) which provides a small amount of slack in the belt across the occupant as the seat vertically rises. FIG. 3A shows seat 12 and belt link 100 in one position and FIG. 3B shows seat 12 and belt link 100 in a second raised (adjusted) position. Although not shown in FIGS. 3A and 3B, seat belt link 102 moves similarly and simultaneously with seat belt link 100.

As seen in the Figures, the preferred mechanism 96 shown includes the same linking components (follower link, drive link, slave link etc.) on the outboard side as on the inboard side of the vehicle. These components function together in response to rear motor 84, torsion bar 82, etc. to adjust the seat belt on both sides of the occupant. Alternatively however, the mechanism for moving the seat belt to adjust for vertical seat movement may merely include components on one of the sides of the vehicle to achieve the desired belt adjustment.

Figure 7:
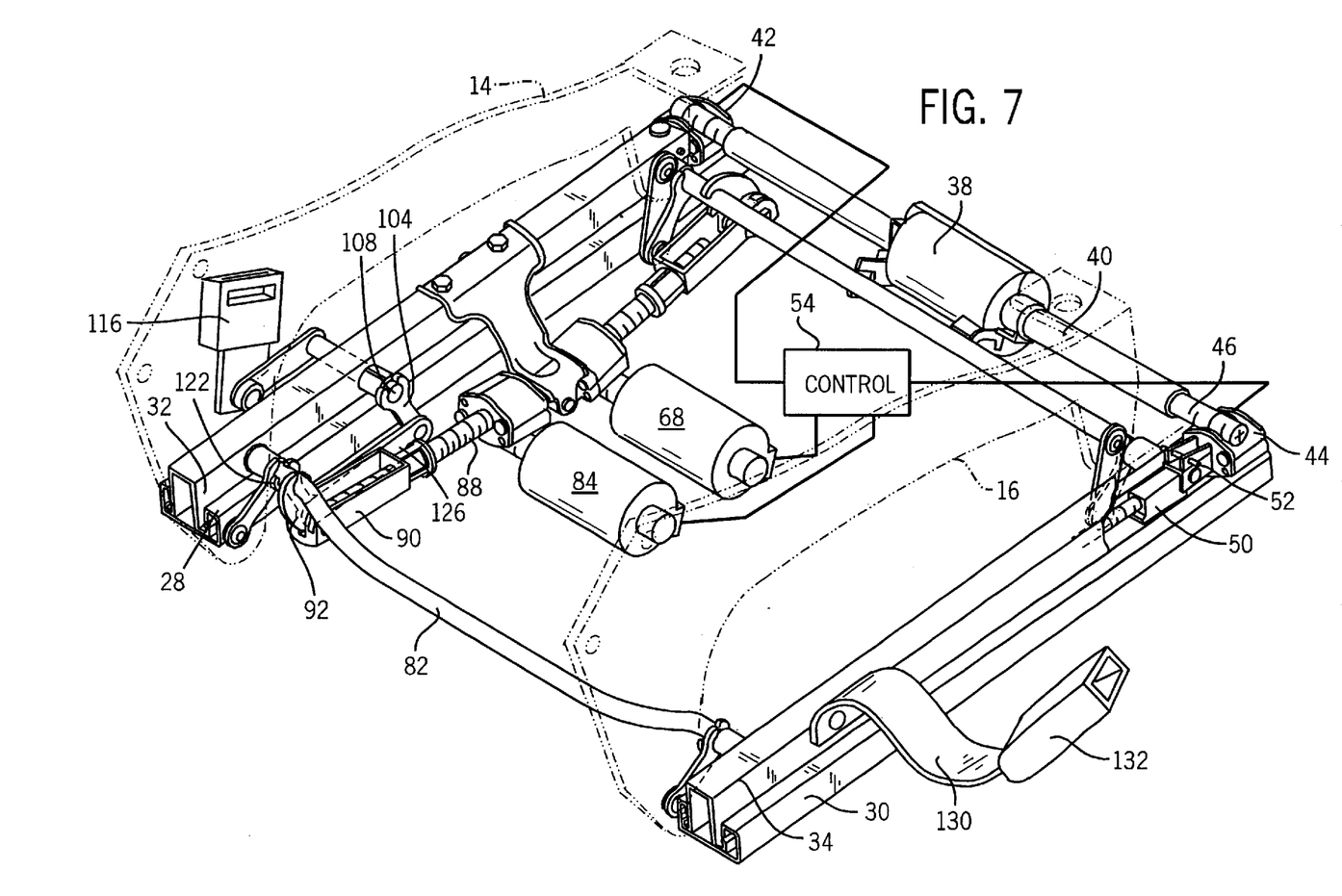
FIG. 7 is a perspective view of the seat apparatus of FIG. 1 incorporating an alleviate embodiment of the mechanism for moving a seat belt in accordance with the present invention.

In FIG. 7 for example, there is shown an alternate embodiment for the seat belt linking components in FIG. 1. The seat belt linking components on the inboard side of the vehicle have been removed. In place of such components, there is shown a strap 130 pivotably attached at one end thereof to the outside of upper track 34 and a buckle 132 at the other end thereof. In this FIG. 7, note that on the inboard side of a vehicle there is neither any seat belt drive link on the outside of upper track 34 nor any seat belt driving linkages (follower link, slave link, drive link) on the inside of upper track 34. Strap 130 cannot be moved to elevate and adjust the belt as seat 12 moves vertically. Strap 130 is merely adapted to pivot with respect to upper track 34. The mechanism 96 however includes the same linking components (seat belt drive link 122, follower link 126, slave link 104) on the outboard side of the vehicle so that mechanism 96 may continue to perform the desired function of adjusting the seat belt to provide slack to the belt across the occupant as he/she moves vertically (as in FIG.

Figures 4, 5, 6A, 6B:
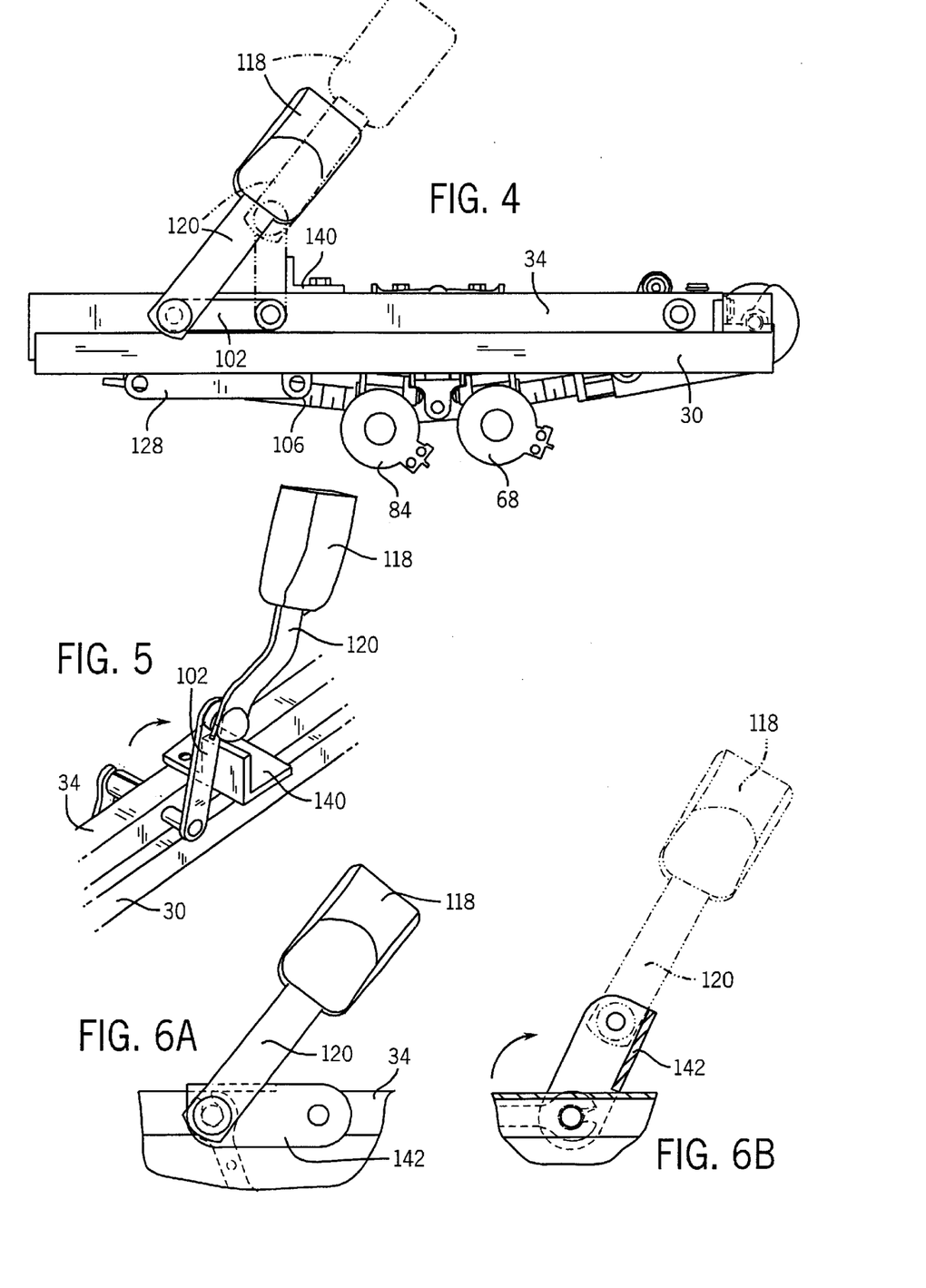
FIG. 4 is a side view of the seat apparatus in FIG. 1 showing a stop feature.
FIG. 5 is an exploded view of the stop feature shown in FIG. 4.
FIG. 6A is a side sectional view of a knee joint link when the seat belt is in a resting position.
FIG. 6B is a cross sectional view of a knee joint link in FIG. 6A acting as a stop, thereby limiting further movement of the buckle.

FIGS. 4 and 5 illustrate an additional feature to seat apparatus 10 shown in FIG. 1. A stop 140 is shown which is attached to the upper track 34. Stop 140 functions to stop the movement of seat belt link 102 from rotating past a desired point during a load from a crash. Stop 140 extends outwardly in the path of seat belt link 102 to perform the desired function. Another option is shown in FIGS. 6A and 6B. Knee joint link 142 is shown which functions as the seat belt link 102. Knee joint link 142 is pivotably attached to the inside and outside of upper track 34. As the knee joint link 142 rotates forward the knee joint link 142 contacts the top of upper track 34 thereby stopping the forward movement of link 142. Stop 140 and knee joint link 142 shown in FIGS. 4–6 may be employed to satisfy vehicle law or original equipment manufacturer ("OEM") requirements for the resulting excursion seen by the rotating seat belt link.

Although the seat apparatus 10 described herein applies to the driver side of a vehicle, it may be designed in a similar configuration for any location in a vehicle including the passenger side. For the apparatus 10 located on the passenger side, a seat apparatus 10 would look as if it appeared in a mirror. The strap and attached buckle would be positioned on the inboard side and the seat belt would be positioned on the outboard side of a vehicle. The mechanism for moving a seat belt to adjust for vertical movement of a seat includes the same components as that mechanism that performs the same function of apparatus 10 on the driver side of a vehicle. The same components would appear in reverse at they would appear in a mirror.

While the present invention has been described and illustrated in connection with the embodiments and components described above, it is not to be limited to those descriptions but is to be limited solely by the scope of the claims which follow.

What is claimed is:

1. A seat apparatus for a vehicle comprising:
   a first mechanism for moving a seat horizontally relative to a floor of the vehicle, the first mechanism including:
      first and second lower tracks mounted to the floor of the vehicle; and
      first and second upper tracks movably carried on the first and second lower tracks, respectively;
   a second mechanism movably mounted to the first and second upper tracks for moving the seat vertically relative to the floor of the vehicle, the second mechanism including a pair of lift links for engaging the seat and a motor drive assembly operatively associated with the pair of lift links for causing the lift links to pivot and the seat to move vertically;
   a third mechanism for moving a seat belt to adjust for vertical movement of the seat in order to insure that the seat belt will remain stationary relative to an occupant seated on the seat, the third mechanism including a pair of seat belt links pivotably attached at one end thereof to the first and second upper tracks respectively, and the motor drive assembly operatively associated with the pair of seat links for causing the pair of seat links to pivot; and
   a stop mounted on at least one of the first and second upper tracks for limiting motion of the pair of seat belt links.

2. The seat apparatus of claim 1, wherein the third mechanism includes a plurality of links responsive to rotational movement of a torsion bar for causing the pair of seat belt links to pivot.

3. The seat apparatus of claim 2, wherein the plurality of links includes a slave link, a follower link and a drive link.

4. The seat apparatus of claim 3, wherein the slave link is secured to at least one of the pair of seat belt links by a rod member.

5. The seat apparatus of claim 3, wherein the drive link is secured to the torsion bar.

6. A seat apparatus for a vehicle comprising:
a first mechanism for moving a seat horizontally relative to a floor of the vehicle, the first mechanism including:
first and second lower tracks mounted to the floor the vehicle; and
first and second upper tracks movably carried on the first and second lower tracks, respectively;
a second mechanism movably mounted to the first and second upper tracks for moving the seat vertically relative to the floor of the vehicle, the second mechanism including a pair of lift links attached to a torsion bar having first and second ends rotatably mounted to the first and second upper tracks, respectively, the torsion bar being operatively associated with a drive motor assembly to cause said torsion bar to rotate for causing the pair of lift links to move the seat generally vertically; and
a third mechanism for moving a seat belt to adjust for vertical movement of the seat in order to ensure that the seat belt will remain substantially stationary relative to an occupant seated in the seat, the third mechanism including a first seat belt link pivotally coupled to the first upper track, a slave link coupled to the first seat belt link, a follower link coupled to the slave link, a drive link secured to the torsion bar and coupled to the follower link to cause the first seat belt link to pivot.

7. The seat apparatus of claim 6, wherein the third mechanism includes a second seat belt link attached to the second upper track.

8. The seat apparatus of claim 7, wherein the third mechanism includes a second drive link, a second slave link, a second follower link responsive to the rotational motion of the torsion bar for causing the second seat belt link to pivot.

9. The seat apparatus of claim 6 wherein the third mechanism includes a strap having a first end pivotably attached to the vehicle and a second end attached to a buckle.

10. A seat apparatus for a vehicle comprising:
a first mechanism for moving a seat horizontally relative to a floor of the vehicle, the first mechanism including:
first and second lower tracks mounted to the floor of the vehicle; and
first and second upper tracks movably carried on the first and second lower tracks, respectively;
a second mechanism movably mounted to the first and second upper tracks for moving the seat substantially vertically relative to the floor of the vehicle, the second mechanism including a pair of lift links for lifting the seat and a drive motor assembly operatively associated with the pair of lift links for causing the pair of lift links to move the seat generally vertically;
a third mechanism for moving a seat belt to adjust for vertical movement of the seat in order to ensure that the seat belt will remain substantially stationary relative to an occupant seated in the seat, the third mechanism including a seat belt link pivotally engaged to the first upper track and a motor drive assembly operatively associated with the seat belt link to cause the seat belt link to pivot; and
a stop mounted to the first upper track for limiting rotational movement of the seat belt link.

11. A seat apparatus for a vehicle comprising:
a first mechanism for moving a seat horizontally relative to a floor of the vehicle, the first mechanism including:
first and second lower tracks mounted to the floor of the vehicle; and
first and second upper tracks movably carried on the first and second lower tracks, respectively;
a second mechanism movably mounted to the first and second upper tracks for moving the seat substantially vertically relative to the floor of the vehicle, the second mechanism including a pair of lift links for lifting the seat and a drive motor assembly operatively associated with the pair of lift links for causing the pair of lift links to move the seat generally vertically; and
a third mechanism for moving a seat belt to adjust for vertical movement of the seat in order to ensure that the seat belt will remain substantially stationary relative to an occupant seated in the seat, the third mechanism including a seat belt link pivotally engaged to the first upper track and a motor drive assembly operatively associated with the seat belt link to cause the seat belt link to pivot;
wherein the seat belt link includes a knee joint link for limiting rotational motion of the seat belt link.

12. A seat apparatus for a vehicle the apparatus comprising:
a first mechanism for moving a seat horizontally relative to a floor of the vehicle and having first and second lower tracks mounted to a floor of the vehicle and first and second upper tracks movably carried on the first and second lower tracks, respectively, the upper tracks supporting the seat;
a second mechanism movably mounted to the first mechanism for moving the seat vertically relative to the floor of the vehicle, the second mechanism including a torsion bar rotatably mounted to the first and second upper tracks and attached to at least one link for supporting the seat and a motor drive assembly operatively associated with the torsion bar to cause the torsion bar to rotate and move the seat vertically; and
a third mechanism for moving a seat belt to adjust for vertical movement of the seat and being responsive to the motor drive assembly for moving the seat belt simultaneously with vertical movement of the seat, the third mechanism including a seat belt link coupled at least to one of the upper tracks, a slave link coupled to the seat belt link, a follower link coupled to the slave link, and a drive link coupled to the follower link and to the torsion bar.

13. The seat apparatus of claim 12, wherein the slave link is secured to the seat belt link by a rod member.

14. The seat apparatus of claim 13, wherein the rod member is movably received in one of the upper tracks.

15. The seat apparatus of claim 12, further comprising a seat belt component coupled to the seat belt link.

16. The seat apparatus of claim 12, wherein the follower link is rotationally coupled to the drive link and the slave link.

17. The seat apparatus of claim 12, further comprising a stop member coupled to at least one of the upper tracks to limit motion of the seat belt link.

* * * * *